United States Patent
Appleton et al.

(10) Patent No.: US 10,955,302 B2
(45) Date of Patent: Mar. 23, 2021

(54) TORQUE DETERMINATION SYSTEM AND METHOD

(71) Applicant: Deere & Company, Moline, IL (US)

(72) Inventors: Andy B. Appleton, Cedar Falls, IA (US); Robert J. White, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/159,369

(22) Filed: Oct. 12, 2018

(65) Prior Publication Data
US 2020/0116580 A1 Apr. 16, 2020

(51) Int. Cl.
*G01L 3/00* (2006.01)
*G01L 3/10* (2006.01)
*F16H 59/16* (2006.01)

(52) U.S. Cl.
CPC .............. *G01L 3/109* (2013.01); *G01L 3/101* (2013.01); *F16H 59/16* (2013.01)

(58) Field of Classification Search
CPC .......... G01L 3/109; G01L 3/101; F16H 59/16
USPC .................................................... 73/862.326
See application file for complete search history.

(56) References Cited

U.S. PATENT DOCUMENTS

| | | | | |
|---|---|---|---|---|
| 4,183,242 A | * | 1/1980 | Brown | G01L 3/101 73/862.328 |
| 4,453,420 A | * | 6/1984 | Nakane | G01L 3/109 73/862.326 |
| 4,785,242 A | * | 11/1988 | Vaidya | G01D 5/147 310/68 B |

(Continued)

FOREIGN PATENT DOCUMENTS

| | | |
|---|---|---|
| DE | 4232040 C2 | 4/1993 |
| DE | 102017207242 A1 | 1/2018 |

OTHER PUBLICATIONS

German Search Report issued in German Application No. 102019213245 dated Jun. 25, 2020. (10 pages).

*Primary Examiner* — Max H Noori
(74) *Attorney, Agent, or Firm* — Klintworth & Rozenblatt IP LLP (57) ABSTRACT

The system and method determines the torque applied to a rotating shaft by a load. A first sensor detects rotation of a first wheel and a second sensor detects rotation of a second wheel. A third sensor is proximate to the first sensor. A processor determines: 1) a magnitude of a phase angle ($\varphi_A$) based on the first and second sensors and having an unknown sign; 2) a magnitude of a phase angle ($\varphi_B$) based on the second and third sensors and having an unknown sign; and 3) a magnitude of a phase angle ($\varphi_C$) based on the first and third sensors and having a known sign. The processor determines a sign of the phase angle ($\varphi_A$) based on the values of the phase angles ($\varphi_B$) and ($\varphi_C$) and determines a torque value from the load applied to the shaft at least in part based on the magnitude and sign of the phase angle ($\varphi_A$).

20 Claims, 5 Drawing Sheets

(56) References Cited

U.S. PATENT DOCUMENTS

| | | | | |
|---|---|---|---|---|
| 4,881,414 | A * | 11/1989 | Setaka | G01L 3/101 |
| | | | | 73/862.331 |
| 5,067,354 | A * | 11/1991 | Kawai | G01L 3/109 |
| | | | | 73/862.328 |
| 5,301,559 | A | 4/1994 | Tsuji et al. | |
| 5,501,110 | A | 3/1996 | Peilloud et al. | |
| 5,675,095 | A | 10/1997 | Ballantyne | |
| 5,734,108 | A | 3/1998 | Walker et al. | |
| 6,237,428 | B1 | 5/2001 | Odachi et al. | |
| 6,776,058 | B1 * | 8/2004 | Schroeder | G01L 3/104 |
| | | | | 73/862.333 |
| 8,001,848 | B2 | 8/2011 | White et al. | |
| 8,966,978 | B2 | 3/2015 | Pannek | |
| 2002/0117012 | A1 | 8/2002 | Lec | |
| 2005/0172732 | A1 * | 8/2005 | Feng | G01D 5/145 |
| | | | | 73/862.332 |
| 2009/0312959 | A1 | 12/2009 | Borman | |
| 2012/0325020 | A1 * | 12/2012 | Mueller | G01L 3/109 |
| | | | | 73/862.193 |
| 2016/0195442 | A1 * | 7/2016 | Saito | G01L 3/109 |
| | | | | 73/862.325 |
| 2018/0003578 | A1 | 1/2018 | Leonard et al. | |

\* cited by examiner

TORQUE DETERMINATION SYSTEM AND METHOD

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure pertains to a system and method for determining torque and in particular, a system and method to determine the sign of a phase angle when measuring torque applied to a rotating shaft in a work vehicle.

BACKGROUND OF THE DISCLOSURE

Various work vehicles, such as used in the agriculture, construction and forestry (and other) industries, use rotating shafts to transmit power from the power source (e.g., internal combustion engine) to various driveline, work implement or other load components. The torque supplied by the power source may, for example, be directed through a transmission system in order to alter (e.g., increase) the delivered torque. The (estimated or actual) amount of torque delivered to the load components may be important data for various vehicle control systems as well as to reduce the occurrence of exceeding the torque capacity of vehicle components (e.g., shafts or subsequent load components). Some known systems use tone wheels to measure torque based on a measured amount of twist in the rotating shaft, where the rotational orientation of each tone wheel is detected by a sensor (e.g., an electromagnetic pick-up), each of which provides a voltage output signal. However, when measuring the phase shift based on the two pick-ups, it is difficult to determine the sign of the phase shift, that is, whether the phase shift is negative or positive, without complex processing. Without knowledge of the sign of the phase shift, erroneous torque measurement may result. Inaccurate torque assessment may thus lead to various inefficiencies in vehicle operation, such as the use of load components with torque capacities in excess of that required for a given vehicle system.

SUMMARY OF THE DISCLOSURE

This disclosure provides a system and method for determining the torque applied to a rotating shaft by an analysis of the phase angle and sign of the phase angle produced by tone wheels coupled to rotating shaft.

In one aspect, the disclosure provides a system for determining torque applied to a rotating shaft by a load. A first wheel is coupled to the shaft at a first axial position, the first wheel having a periphery with a plurality of first repeating target surfaces. A second wheel is coupled to the shaft at a second axial position axially spaced from the first axial position, the second wheel having a periphery with a plurality of second repeating target surfaces. A first sensor positioned proximate the periphery of the first wheel is configured to detect rotation of the first wheel based on the first repeating target surfaces, corresponding to rotation of the shaft at the first axial position. A second sensor positioned proximate the periphery of the second wheel is configured to detect rotation of the second wheel based on the second repeating target surfaces, corresponding to rotation of the shaft at the second axial position. A third sensor positioned proximate the periphery of the first wheel is configured to detect rotation of the first wheel based on the first repeating target surfaces, wherein the third sensor is located at a fixed known angular displacement from the first sensor. A processor is configured to receive signals from the first sensor, the second sensor and the third sensor. The processor determines a first voltage ($V_1$), a second voltage ($V_2$), and a third voltage ($V_3$), corresponding to an output of the first sensor, the second sensor, and the third sensor, respectively. The processor determines a first voltage difference ($V_{12}$) associated with the signals from the first sensor and the second sensor, determines a second voltage difference ($V_{13}$) associated with the signals from the first sensor and the third sensor, and determines a third voltage difference ($V_{23}$) associated with the signals from the second sensor and the third sensor. The processor determines a magnitude of a phase angle ($\varphi_A$) of the first wheel with respect to the second wheel based on the first voltage difference ($V_{12}$). The processor determines a sign of the phase angle ($\varphi_A$) based on the second voltage difference ($V_{13}$) and the third voltage difference ($V_{23}$). The processor determines a torque value from the load applied to the shaft at least in part based on the magnitude and sign of the phase angle ($\varphi_A$).

In another aspect the disclosure provides a method for determining torque applied to a rotating shaft by a load, the shaft having a first wheel disposed at a first axial position with a plurality of first repeating target surfaces on its periphery, a second wheel located at a second axial position with a plurality of second repeating target surfaces on its periphery, a first sensor proximate the periphery of the first wheel, a second sensor proximate the periphery of the second wheel, and a third sensor proximate the periphery of the first wheel. The third sensor is located at a fixed known angular displacement from the first sensor. The method includes: determining a first voltage ($V_1$), a second voltage ($V_2$), and a third voltage ($V_3$), corresponding to an output of the first sensor, the second sensor, and the third sensor, respectively; determining a first voltage difference ($V_{12}$) associated with the signals from the first sensor and the second sensor; determining a second voltage difference ($V_{13}$) associated with the signals from the first sensor and the third sensor; determining a third voltage difference ($V_{23}$) associated with the signals from the second sensor and the third sensor; determining a magnitude of a phase angle ($\varphi_A$) of the first wheel with respect to the second wheel based on the first voltage difference ($V_{12}$); determining a sign of the phase angle ($\varphi_A$) based on the second voltage difference ($V_{13}$) and the third voltage difference ($V_{23}$); and determining a torque value from the load applied to the shaft at least in part based on the magnitude and sign of the phase angle ($\varphi_A$).

In yet another aspect the disclosure provides a system for determining torque applied to a rotating shaft by a load. A first wheel is coupled to the shaft at a first axial position, the first wheel having a periphery with a plurality of first repeating target surfaces. A second wheel is coupled to the shaft at a second axial position axially spaced from the first axial position, the second wheel having a periphery with a plurality of second repeating target surfaces. A first sensor proximate the periphery of the first wheel is configured to detect rotation of the first wheel based on the first repeating target surfaces, corresponding to rotation of the shaft at the first axial position. A second sensor proximate the periphery of the second wheel is configured to detect rotation of the second wheel based on the second repeating target surfaces, corresponding to rotation of the shaft at the second axial position. A third sensor proximate the periphery of the first wheel is configured to detect rotation of the first wheel based on the first repeating target surfaces, wherein the third sensor is located at a fixed known angular displacement from the first sensor. A processor is configured to receive signals from the first sensor, the second sensor and the third sensor. The processor determines a first voltage ($V_1$), a second voltage ($V_2$), and a third voltage ($V_3$), corresponding to an output of the first sensor, the second sensor, and the third sensor, respectively. The processor determines a first voltage difference ($V_{12}$) associated with the signals from the first sensor and the second sensor, determines a second voltage difference ($V_{13}$) associated with the signals from the first sensor and the third sensor, and determines a third voltage difference ($V_{23}$) associated with the signals from the second sensor and the third sensor. The processor determines a magnitude of the phase angle ($\varphi_A$) based on the first voltage ($V_1$) and the second voltage ($V_2$), wherein the phase angle ($\varphi_A$) has an unknown sign, determines a magnitude of a phase angle ($\varphi_B$) based on the second voltage ($V_2$) and the third voltage ($V_3$), wherein the phase angle ($\varphi_B$) has an unknown sign, and determines a magnitude of a phase angle ($\varphi_C$) based on the first voltage ($V_1$) and the third voltage ($V_3$), the phase angle ($\varphi_C$) having a known sign. The processor assigns the phase angle ($\varphi_A$) as positive or negative to resolve a sum of the phase angle ($\varphi_A$)+the phase angle ($\varphi_B$) equal to the phase angle ($\varphi_C$), and assigns the phase angle delta ($\varphi_B$) as positive or negative to resolve the sum of the phase angle ($\varphi_A$)+($\varphi_B$) equal to the phase angle delta ($\varphi_C$). The processor determines the torque based on the magnitude of the phase angle ($\varphi_A$) and the assigned sign.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed method and system for determining torque applied to a rotating shaft. Various modifications to the example embodiments may be contemplated by one of skill in the art.

The term "axial" as used herein refers to a direction that is generally parallel to an axis of rotation, axis of symmetry, or centerline of a component or components. For example, in a cylinder with a centerline and opposite, circular ends, the "axial" direction may refer to the direction that generally extends in parallel to the centerline between the opposite ends. In certain instances, the term "axial" may be utilized with respect to components that are not cylindrical (or otherwise radially symmetric). For example, the "axial" direction for a rectangular housing containing a rotating shaft may be viewed as a direction that is generally in parallel with the rotational axis of the shaft. Furthermore, the term "radially" as used herein may refer to a direction or a relationship of components with respect to a line extending perpendicularly outward from a shared center line, axis, or similar reference. For example, two concentric and axially overlapping cylindrical components may be viewed as "radially" aligned over the portions of the components that axially overlap, but not "radially" aligned over the portions of the components that do not axially overlap. In certain instances, components may be viewed as "radially" aligned even though one or both of the components may not be cylindrical (or otherwise radially symmetric).

This disclosure pertains to a system and method for determining the magnitude of torque applied to a rotating shaft by an analysis of the phase angle and sign of the phase angle of output signals generated by sensors (e.g., electromagnetic pickups). Such output signals may be generated by sensing repeating target surfaces at two or more axially spaced apart locations with respect to the loaded shaft. In some embodiments, the repeating target surfaces may be on the shaft itself or on an extension of the shaft that co-rotates with the loaded shaft. In other embodiments, the repeating target surfaces are on a component this is offset from, but co-rotates with the loaded shaft, such that the target surfaces pass at a frequency that is equivalent to that of the corresponding axial position of the loaded shaft. In other words, the target surfaces need not be physically located on the loaded shaft (or extension thereof), but may be on another, unloaded shaft (or extension thereof) such that the loaded shaft phase angle is determined based on sensing of one or more unloaded shafts. This disclosure thus contemplates that various arrangements (e.g., various gear sets) may be included to maintain a consistent rotation (i.e., common target surface pass frequency) between the loaded shaft and one or more unloaded shafts.

In certain embodiments, the repeating target surfaces sensed as a part of the difference determination may be in the form of a set (e.g., a pair) of disks or wheels with undulating peripheries (e.g., curved or rectilinear toothed, grooved, notched, castellated, etc.) mounted to the same or different rotating shafts at different axial positions. In some cases, these may be referred to as tone wheels. Sensors (e.g., magnetic induction (or Hall effect) sensors, optical sensors, etc.) may detect the alternating projections of the undulating peripheries and output corresponding signals (e.g., any of various voltage measurements including root-mean-square, peak or peak-to-peak, absolute value and so on). With the load applied to the shaft, the phase angle (in terms of time or degrees/radians) may be determined for corresponding output signals. The value of the torque applied to the rotating shaft may then be derived by assessment of this loaded phase angle value at specific times or intervals.

In other embodiments, rather than detecting target surfaces formed by physical undulating surfaces (e.g., teeth), the disclosed system and method may sense other features on or mounted to the loaded (or other) shaft(s). For example, various target surfaces in a repeating alignment or arrangement on or mounted to the loaded (or other) shaft(s) may be sensed. Such target surfaces may be at the same or similar radius with respect to the axis of the loaded (or other) shaft(s). Such repeating target surfaces, for instance, may interact with the sensors optically or magnetically in a manner in which undulating peripheries are not required, such as forming a repeating arrangement of reflective or magnetic surfaces, which are separated by non-reflective or magnetic surfaces, along a circumferential surface or otherwise at a common radius. It may further be possible for the output signals to be generated by sensing a single target surface at each axial position of the loaded shaft or other shaft(s) that extends along less than the entire circumference of the associated shaft(s) or extension(s) such that rotation thereof provides the repetition.

Among other uses, the torque determination system and method may be incorporated in a work vehicle, and especially for or within an engine or transmission thereof. The values of the torque applied by a load to one or more shafts of the work vehicle (e.g., engine or transmission) may be used to control operational parameters of the work vehicle (e.g., the engine power, transmission gear selection, etc.) in order to improve various aspects of the work vehicle operation (e.g., engine efficiency, fuel economy, load-impact mitigation, etc.).

Conventional systems that measure and evaluate only two sensor voltages and one difference voltage, in which only electrical phase angle magnitudes may be determined may need to manage or constrain the design to ensure phase angle signs are understood for the torque determination to be accurate. For example, one way to force positive phase angles is to mount one of the sensors on an eccentric (e.g., at the input end of the shaft), which allows one to adjust the no-load phase (or phase difference or shift) during calibration. While running at low load and watching the voltage difference between the two sensors, the eccentric can be manipulated to minimize the voltage difference. Then rotating the eccentric in the direction of shaft rotation forces a positive no-load phase angle. Knowing the voltages and applying the law of cosines, one can calculate what voltage difference gives a desired phase angle. The target phase angle depends on how much negative torque is expected. This can be done to calibrate the system within a constrained phase angle range (e.g., with limited repeating target surfaces). Other techniques might use engine torque and shaft rotation direction to inform certain decisions on the sign of the phase angle. However, typically the no-load phase angle must be kept low or otherwise managed by controlling tolerances between the sensors and/or between the tone wheels.

This disclosure provides a system and method for torque determination in which both the magnitude and sign one or more electrical phase angles is determined as an intermediate step preceding the torque determination. This provides a significant advantage over conventional systems in improved accuracy of the torque determination and extends the useful solution space for phase angles.

Referring to the drawings, the disclosed torque determination system and method may be utilized in the context of a wide range of mobile and fixed applications in which loads are applied to one or more rotating shafts. For example, the disclosed torque determination system and method may be incorporated into various work vehicles, including, agricultural tractors, such as the work vehicle shown in FIG. 1. In that regard, while a tractor is illustrated and described herein as an example work vehicle, one skilled in the art will recognize that principles of the disclosure may be readily adapted for use in other types of non-work and work vehicles, including, for example, various other agricultural machines, and other machines used in the construction and forestry industries, as well as in various non-vehicle applications. As such, this disclosure should not be limited to applications associated with a tractor or the particular example tractor shown and described.

Figure 1:
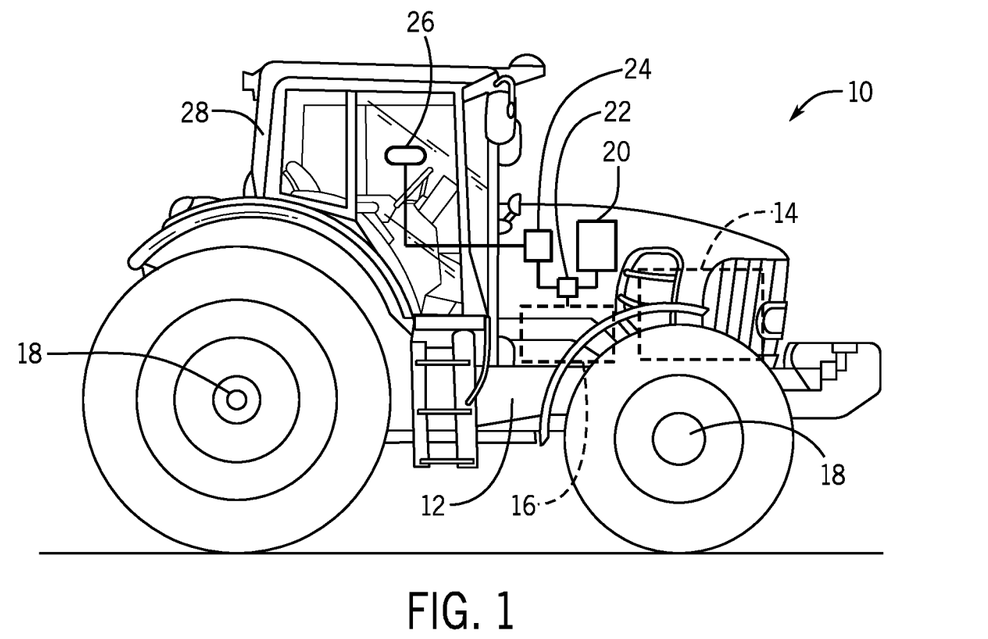
FIG. 1 is side elevational view of a work vehicle in the form of a tractor in which the torque determination system and method according to this disclosure may be incorporated.
Figure 2A:
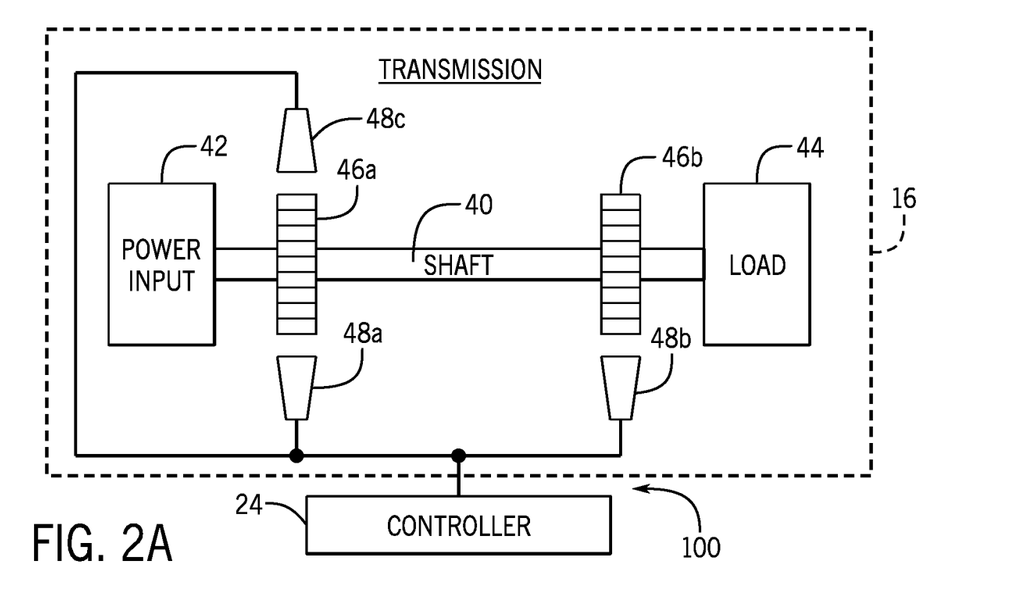
FIG. 2A is a simplified schematic view of an example transmission of the work vehicle of FIG. 1 showing two sensors on a first wheel and one sensor on a second wheel, according to an embodiment of the disclosure.
Figure 2B:
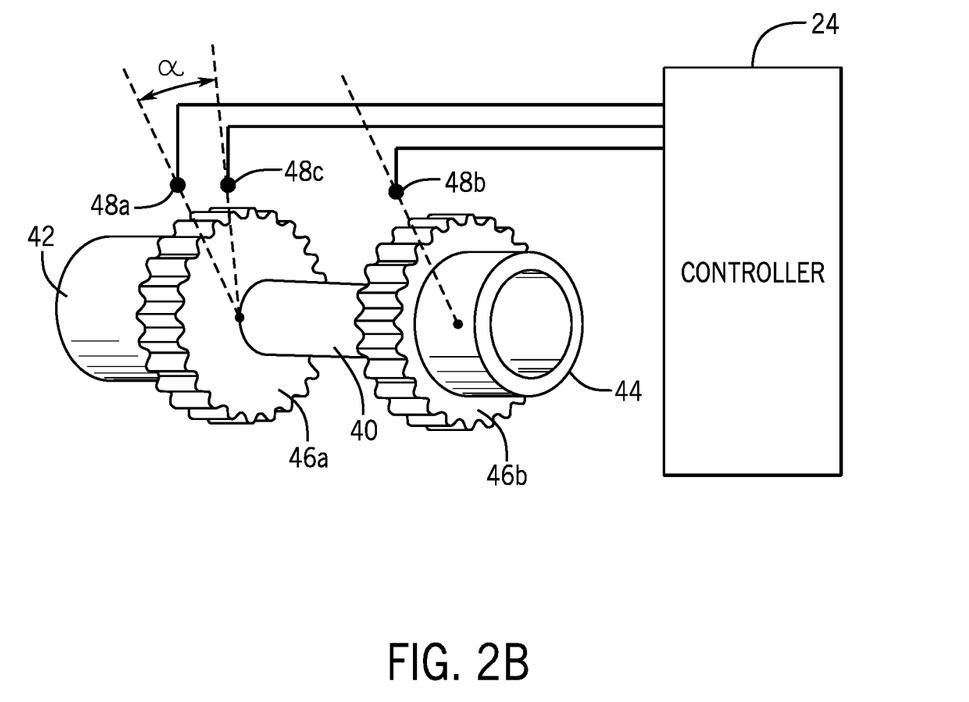
FIG. 2B is simplified mechanical illustration of the schematic view of FIG. 2A.

As shown in FIGS. 1, 2A, and 2B, the work vehicle 10 includes a vehicle frame 12. Supported on the vehicle frame 12 is a source of propulsion 14 that supplies power to a transmission 16. In one example, the engine 14 is an internal combustion engine, such as a diesel engine, that is controlled by a controller 24 or an engine control module. It should be noted that other forms of propulsion may be provided, such as a fuel cell, an electric motor, a hybrid gas-electric power plant, etc. The transmission 16 transfers the power from the engine 14 to a suitable driveline coupled to one or more drive/driven wheels 18 of the work vehicle 10 to enable the work vehicle 10 to travel over terrain. In some embodiments, the work vehicle 10 may include an electrohydraulic system with one or more hydraulic pumps 20 and electrohydraulic valves 22 operated by one or more controllers (e.g., controller 24) having processor and memory architecture suitable to control operational modes of the transmission 16 and/or the engine 14 and/or accompanying implement (not shown). Information related to the engine 14 and the transmission 16 (e.g., current drive mode or gear) can be relayed to the operator via an operator interface 26 (e.g., display screen) in an operator cabin 28.

Figure 3:
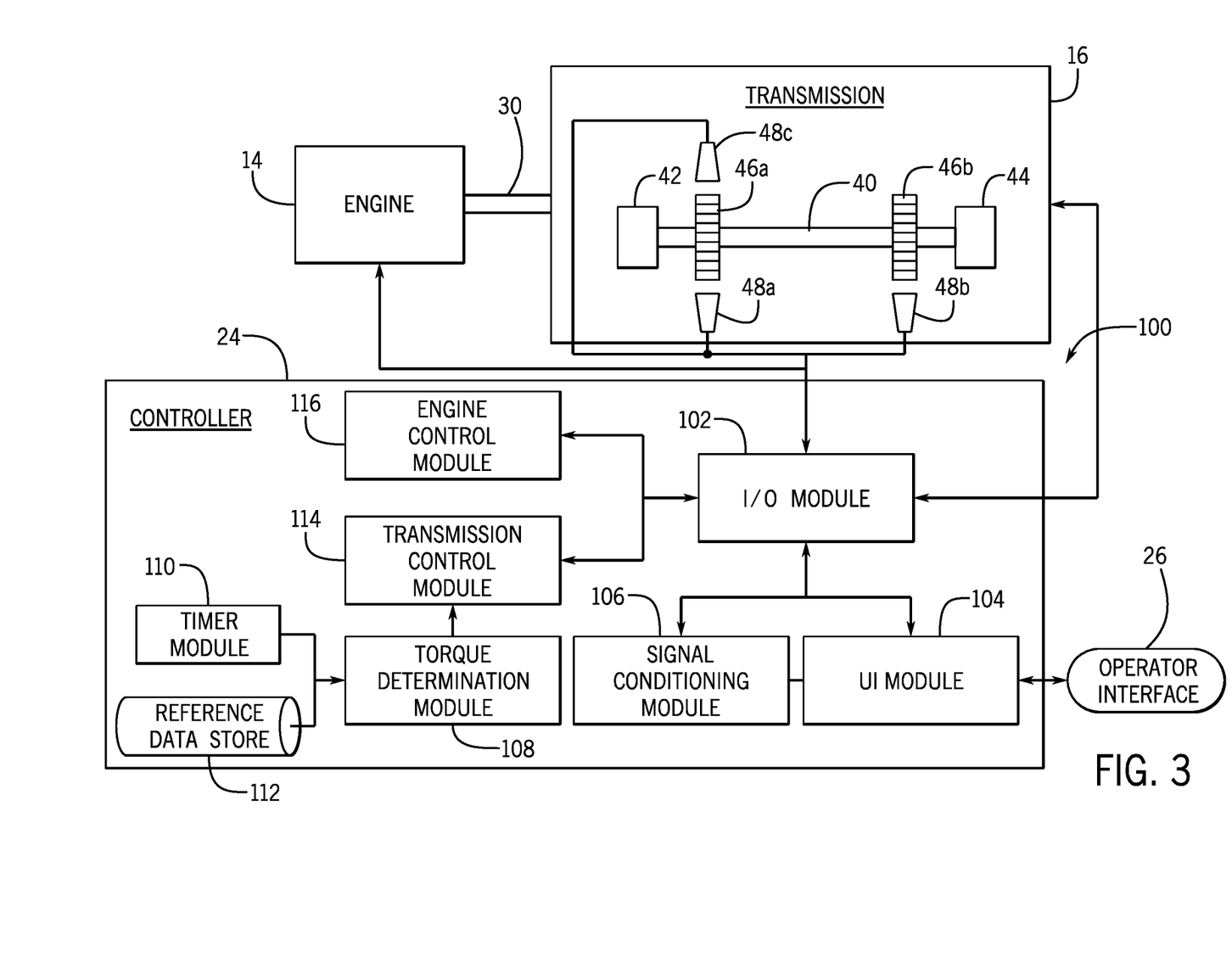
FIG. 3 is simplified schematic view of an example work vehicle control system incorporating the disclosed torque determination system and method.

Referring also to FIG. 3, the transmission 16 may include one or more gears (not shown) for forward and rearward motion of the work vehicle 10, including multiple forward and reverse range gears for propelling the work vehicle 10 at various speeds. In order to transition between gears, the transmission 16 may include various clutches and synchronizers (not shown). The clutches and synchronizers may be selectively coupled to a drive shaft 30 (FIG. 3) so that that the drive shaft 30 may be rotated relative to the gears until a selected gear is engaged by the synchronizer. In this way, engine torque is applied through the drive shaft 30 (and associated clutches and synchronizers), and when engaged, to a selected gear. The selected gear couples the drive shaft 30 to the wheels 18 (e.g., via a transaxle and differential assembly) to power rotation of the wheels 18 and propel the work vehicle 10 across the terrain.

It should be understood that while the drawings and discussion reference application of the disclosed torque determination system and method with respect to the torque load applied by engagement of the ground wheels 18, the disclosed system and method may also be utilized to determine torque applied by non-propulsion loads. For example, the engine may also be coupled directly or via the transmission to a work implement (not shown) via a power take-off shaft (PTO, not shown) or other component not used for propulsion of the work vehicle 10.

The magnitude of torque required of the engine 14 when the drive shaft 30 is coupled to the wheels 18 via the transmission 16 (or coupled to a work implement via the PTO shaft) may vary and may be unknown during all or some of the operation of the work vehicle 10. Some conventional systems measure shaft torque using various techniques that may be less suitable in work vehicle applications (e.g., techniques employing strain gauges, structural acoustic waves, magneto-restriction sensor, eddy currents sensors, etc.) for various reasons (e.g., lack of robustness, difficulty in obtaining and transmitting a useable signal, cost, complexity, accuracy, etc.).

The disclosed system and method may be utilized efficiently to determine the amount of torque required of the engine or various intermediate components by assessing the amount of torsion or angular twist about a rotation axis of a rotating shaft between two positions along the rotation axis. By analyzing the phase angle and sign of the phase angle of the corresponding output signals generated by pickups or sensors at different axial positions along the shaft, the disclosed system and method may derive the required torque value with an enhanced accuracy, and thereby provide for enhanced control of operational parameters of the work vehicle 10.

In the illustrated example, within the transmission 16 (e.g., a gear case or housing thereof) is mounted gears and various rotating shafts. For simplicity, a single transmission shaft 40 is depicted in FIGS. 2A, 2B, and 3. The transmission shaft 40 may be coupled to the engine 14 and the drive shaft 30 may be represented by a power input component 42. The other end of the transmission shaft 40 may be coupled to the wheels 18 (or other non-propulsion work component) as represented by a load component 44.

The power input component 42 and the load component 44 may correspond to two disks or wheels (tone wheels), including a first tone wheel 46a and a second wheel 46b, which may be mounted directly or indirectly via an intermediate member, to the transmission shaft 40 in a suitably fixed manner. For example, the tone wheels 46a, 46b may be mounted via a permanent weld, interference splined connection, and the like, such that the first and second wheels 46a, 46b co-rotate with the transmission shaft 40.

Detectors or pickups, such as a first sensor 48a and a second sensor 48b, may be mounted within the transmission 16 to detect rotation of the tone wheels 46a, 46b, respectively, and thereby the angular position of the first and second tone wheels 46a, 46b, respectively. A third sensor 48c may be mounted near either the first tone wheel 46a or the second tone wheel 46b. It is immaterial which tone wheel the third sensor 48c senses. For purposes of clarity and illustration, the third sensor 48c is shown mounted proximate the first tone wheel 46a, and is located at a fixed known angular position (shown in FIG. 2B as a) relative to the first sensor 48a. The sensors 48a, 48b, 48c are electrically coupled to the controller 24. It should be noted that while the illustrated example of the disclosed system and method is contained in the transmission housing, it could be incorporated in various other components of the work vehicle 10 (e.g., engine, motor, axle, final drive, or other assembly of the driveline or the power train to a work implement having a rotating shaft).

The tone wheels 46a, 46b may be of any suitable type and configuration. The tone wheels 46a, 46b may each be a disk-shaped or annular member (e.g., generally a "gear" or "disk") with an outer periphery (e.g., an outer diameter in the case of a circular disk or annular member) that has a radially-varied or undulating configuration. In certain embodiments, the tone wheels 46a, 46b are of the same configuration, each being a circular disk with an undulating outer periphery forming alternating radially-extending projections and recesses along the circumference of the disk. The undulating periphery may, for example, have a notched, slotted, grooved, castellated, faceted or toothed configuration.

As shown in FIGS. 2A and 2B, the tone wheels 46a, 46b may be located at or near the ends of the transmission shaft 40 proximate the power input component 42 and the load component 44, respectively. They may also be located along the shaft 40 in different locations and relative axial positions. In certain cases, however, the axial positioning of the wheels 46a, 46b may be such that they are preferentially spaced apart axially to enhance the sensitivity of the system according to the expected torsion and/or length of the shaft in a particular application. For example, further axial spacing may be preferred in relatively low-torsion and/or long-shaft applications to enhance the system sensitivity. Reduced axial spacing may be allowed or needed in high-torque and/or relatively short-shaft applications. Further, it should be understood that while the example embodiments illustrated and described herein have the tone wheels mounted to the same shaft for which torque is being measured, in other configurations, one or both of the wheels may be arranged on one or more different shafts. In such cases, various arrangements (e.g., various gear sets) may be included to maintain a consistent rotation angle (e.g., to maintain a common angular orientation pass frequency) between each offset wheel and the corresponding axial position along the loaded shaft.

The sensors 48a, 48b, 48c may be any suitable type and configuration suitable to detect the rotation of the tone wheels 46a, 46b, and thereby the transmission shaft 40, and any corresponding variance in the angular position of one tone wheel 46a with respect to the other tone wheel 46b, and to generate electric output signals corresponding to the alternating close and near presence of the undulating peripheries as the tone wheels 46a, 46b rotate. In the illustrated example, the sensors 48a, 48b, 48c may be magnetic induction or Hall effect type sensors, which generate nominal output voltages in response to the relative proximity of the alternating projections of the outer peripheries of the tone wheels 46a, 46b, which in the illustrated example each have a castellated periphery. In this case, the sensitivity of the sensors 48a, 48b, 48c may be affected by the positioning (e.g., orientation, alignment, spacing, etc.) of the sensors 48a, 48b, 48c with respect to the corresponding tone wheels 46a, 46b as well as by the profile of the wheel peripheries and the speed of shaft rotation, in that such factors affect the induced voltage, which in turn, affects the relative peak-to-peak voltage and phase angle of and between the sensors 48a, 48b, 48c.

It should be understood that various other sensor types may be used with the disclosed torque determination system and method. For example, the sensors may be optical sensors which detect rotation and generate output signals based upon sensing the presence or absence of reflected or emitted light (e.g., in the visible, ultraviolet, infrared or other ranges of the electromagnetic spectrum), or sensing such light having a characteristic (e.g., intensity, brightness, etc.) beyond or within a threshold value or range. Other types of sensors may also be used.

In the illustrated example, the transmission 16, with an example control system 100 and controller 24, including the aforementioned transmission shaft 40, power input component 42, load component 44, tone wheels 46a, 46b, and sensors 48a, 48b, 48c, is mechanically coupled to the engine 14 via the drive shaft 30 and electrically coupled to the controller 24 via suitable electrical lines (e.g., cabling, bus, etc.).

Referring also to FIG. 3, a simplified dataflow diagram illustrates the example control system 100 for the work vehicle 10, which may incorporate the torque determination system and method either as embedded within or augmenting the controller 24 either locally on the work vehicle 10 or remotely off the machine using any of various known wireless transmission protocols. Various embodiments of the control system 100 according to the present disclosure may include any number of other modules or sub-modules embedded within or augmenting the controller 24 that may be combined and/or further partitioned.

Inputs to the control system 100 may be received from the sensors 48a, 48b, 48c, the operator interface 26 and other control modules (not shown) associated with the work vehicle 10, and/or determined/modeled by other sub-modules (not shown) within the controller 24 (or other controllers). In various embodiments, the controller 24 includes an input/output (I/O) module 102, a user interface (UI) module 104, a signal conditioning (SC) module 106, a torque determination (TD) module 108, a timer module 110, a reference data store 112, a transmission control (TC) module 114, and an engine control (EC) module 116.

The I/O module 102 and the UI module 104 receive input data from one or more sources. Among other things, the I/O module 102 may receive input data in the form of analog electrical signals from the sensors 48a, 48b, 48c as will be detailed below. The UI module 104 receives input data from the operator via the operator interface 26, which in turn may transmit and receive data to and from the I/O module 102 and the operator interface 26. The input data may include any type of machine control inputs (and others) for controlling operation of the work vehicle 10 and its implements. In certain embodiments, the UI module 104 may also output one or more notifications to the operator interface 26 (e.g., in the form of audible, tactile and/or visual notifications) to notify the operator of various aspects of the work vehicle 10 and/or the control system 100.

The I/O module 102 receives and transmits the input data from the sensors 48a, 48b, 48c to the SC module 106. The SC module 106 includes circuitry configured to process the raw analog signals from the sensors 48a, 48b, 48c, and may filter the raw analog signals for improved analog processing accuracy. In one embodiment, the processing of the raw and/or filtered analog signal may be performed without converting the analog waveform to a digital squarewave equivalent. Such analog processing may use "voltmeter" techniques where analog voltages are processed (e.g. subtracted, added) using analog components to obtain various voltage values, and such voltage values may then be converted to numbers suitable for manipulation and further processing by computer or microprocessor chips.

Figure 4:
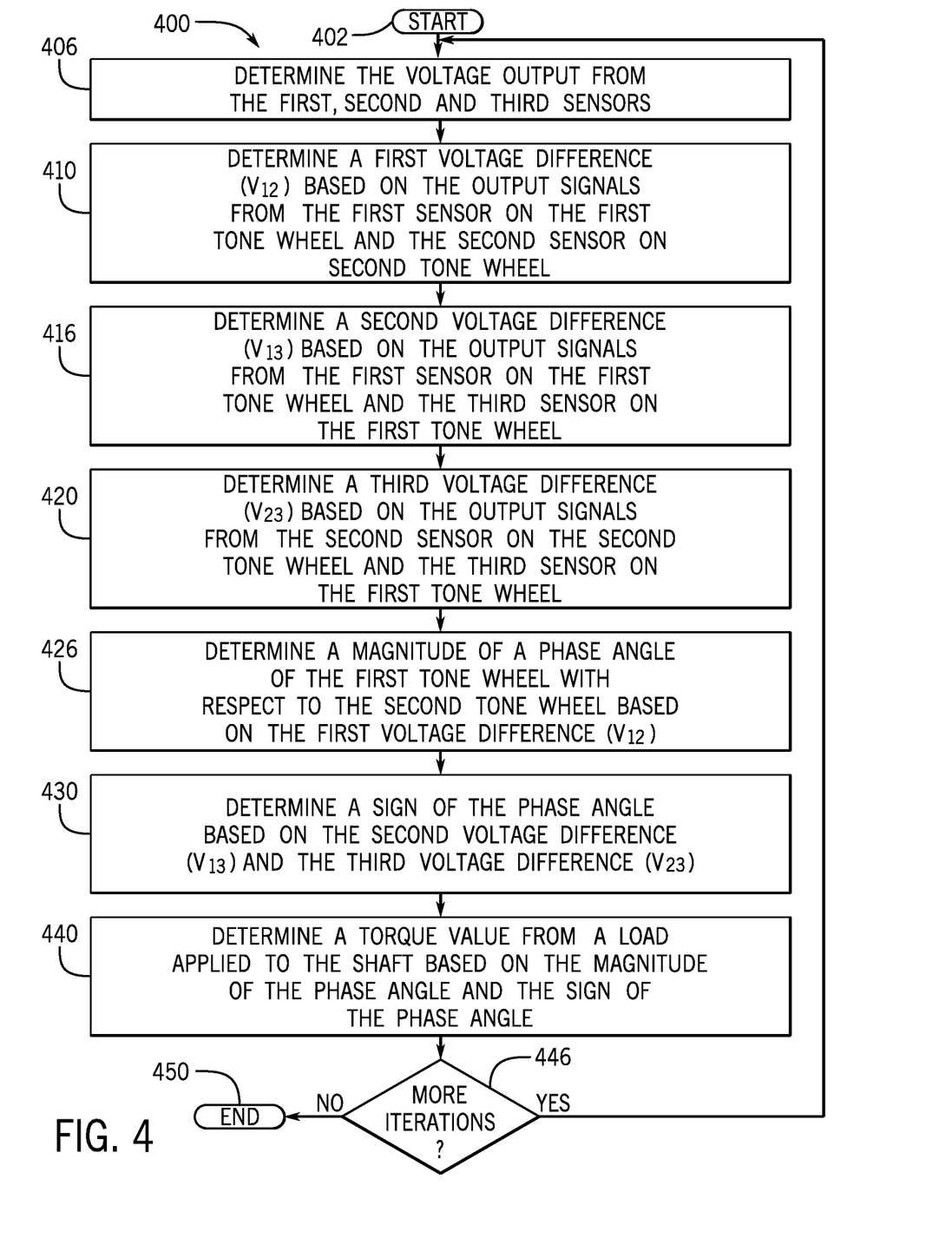
FIG. 4 is a flowchart illustrating the operation of the torque determination system and method, according to an embodiment of the disclosure.

Referring also to FIG. 4, a high-level overview of the processing steps is shown in a flow diagram that illustrates various steps of a torque determination method 400. Note that the following description is at a high level of abstraction corresponding to the steps illustrated in FIG. 4 and a more detailed analysis and explanation follows in the discussion below. As can be appreciated in light of this disclosure, the order of operation within the method 400 is not limited to the depicted sequential execution, but may be performed in one or more varying orders as applicable and in accordance with the present disclosure.

The method 400 begins at 402, and voltage outputs from the first sensor 48a, the second sensor 48b, and the third sensor 48c are obtained 406 by the controller 24. As discussed above, this analog output may be used directly with analog components. Next, the controller 24 may determine 410 a first voltage difference ($V_{12}$) based on the output signals from the first sensor 48a for the first tone wheel 46a and the second sensor 48b for the second tone wheel 46b.

The controller 24 may determine 416 a second voltage difference ($V_{13}$) based on the output signals from the first sensor 48a for the first tone wheel 46a and the third sensor 48c for the first tone wheel 46a. Next, the controller 24 may determine 420 a third voltage difference ($V_{23}$) based on the output signals from the second sensor 48b for the second tone wheel 46b and the third sensor 48c for the first tone wheel 46a. Each of the foregoing voltages and voltage differences may be determined by the processor(s) of the controller 24 as measured input values to the controller 24 from one or more voltmeters with or without various additional calculations being made by the controller 24, such that the voltage differences may either be entirely measured values from measured voltage deltas between sensors or calculated as a diffrences from the individual measured sensor voltages.

Based on the above-obtained voltage differences, the controller 24 may calculate 426 a magnitude of a phase angle between the first tone wheel 46a and the second tone wheel 46b based on the first voltage difference ($V_{12}$). The controller 24 may calculate 430 a sign of the phase angle based on the second voltage difference ($V_{13}$) and the third voltage difference ($V_{23}$). After the magnitude of a phase angle and its sign have been obtained, the controller 24 may calculate 440 a torque value from a measured load applied to the shaft based on the calculated values of the magnitude of the phase angle and its associated sign. If the method 400 is to be a single pass only, or if no further sample iterations are to be undertaken 446, the torque determination process 400 ends at 450. Otherwise, additional or continuous iterations occur with processing continuing 402.

Although not shown in FIG. 4, the torque determination method 400 described above may be continued (or, alternatively, a new control method may be initiated) by supplying the determined torque values to the TC module 114 and/or the EC module 116, which may then utilize the determined torque values to execute various control commands to implement refinements to the state of the engine 14 and/or the transmission 16 to improve the operation of the work vehicle 10. The disclosed method 400 thus provides an accurate torque value determination by consideration and analysis of the magnitude and sign of the detected phase differences.

After the TD module 108 has carried out the prescribed method of determining applied torque, one or more torque values may be passed to the TC module 114 and/or the EC module 116. One or both of these modules may process the torque values to resolve one or more control commands, which are transmitted via the I/O module 102 to one or more actuators within or otherwise controlling various aspects of the engine 14 and/or the transmission 16. As one example, the TC module 114 may resolve commands for the transmission 16 to shift gears, such as to shifting to a lower gear in response to receiving a torque value falling within a specified torque band or above a threshold torque rating of the current gear. As another example, the EC module 116 may resolve commands for the engine 14 that de-rates the output power of the engine 14 in response to receiving a torque value falling within a specified torque band or above a threshold torque value at which normal engine rating would be employed. In both cases, the torque determination system 100 may be used to improve the operational efficiency or optimal state of the work vehicle 10. Further, the UI module 104 may also output data to the operator interface 26 to provide the operator of the work vehicle 20 with the updated vehicle state information following any changes made to the engine 14 or transmission 16 as a result of the torque determination.

The following further describes the system and method of this disclosure. It will be understood that various voltages and voltage differences may be measured by one or more voltmeters. Any calculations or other determinations of various parameters, such as phase angle, phase angle sign, torque and so on, may be undertaken by one or more controllers, such as controller 24, utilizing various modules (e.g., torque determination module 108). The processor(s) of the controller 24 may also be understood as determining the voltage values and voltage differences whether as measured inputs to the controller 24 or separate processed calculations.

The voltage outputs for the sensors 48a, 48b, 48c at the tone wheels 46a, 46b, which can be obtained by voltmeter measurement, are phasors which are shown in the phasor diagram of FIG. 5 as vector quantities that may be expressed in angle notation, as follows.

$$V_1 = |V_1| \angle \phi_1; \phi_1 = 0$$

$$V_2 = |V_2| \angle \phi_2; \phi_2 = \phi_A$$

$$V_3 = |V_3| \angle \phi_3; \phi_3 = \phi_C = Z\alpha + n2\pi, n \in \mathbb{Z}, 0 \leq \phi_3 < 2\pi$$

As noted, the phase angle $\phi_1$ for the voltage $V_1$ may be zero, the phase angle $\phi_2$ for the voltage $V_2$ may be considered phase angle $\phi_A$ with an unknown sign which is to be determined, and the phase angle $\phi_3$ for the voltage $V_3$ may be considered phase angle $\phi_C$. The $\phi_C$ can be determined as the product of the number of pulses (corresponding to teeth or repeating target surfaces) (Z) and the physical angle $\alpha$ (see FIG. 2) between the first sensor 48a and the third sensor 48c mounted at the first tone wheel 46a. This value is rectified to be between 0 and 360 degrees by subtracting the product of the integer n and $2\pi$. Since the phase angle $\phi_C$ is the product of two known quantities, the phase angle $\phi_C$ is also a known quantity, or at least can be estimated or approximated from these known values. More precise valuation of the phase angle $\phi_C$ may be determined by voltage measurement or by calculation. Moreover, once the value of phase angle $\phi_C$ is known, the voltage $V_3$ and $V_{13}$ need only be measured at initial calibration of the system.

The voltage differences are also phasors which are shown in the phasor diagram of FIG. 5 as vector quantities and expressed in angle notation, as follows.

$$V_{12} = |V_1 - V_2| \angle \phi_{12}$$

$$V_{13} = |V_1 - V_3| \angle \phi_{13}$$

$$V_{23} = |V_2 - V_3| \angle \phi_{23}$$

The disclosed system and method utilizes the voltages $V_{12}$ and $V_{23}$ to assess the pertinent phase angles mentioned below. The associated phase angles $\phi_{12}$ and $\phi_{23}$ (as well as phase angle $\phi_{13}$) need not be resolved. However, the phase angles $\phi_{12}$, $\phi_{13}$, $\phi_{23}$ may be utilized in various proof computations to establish the accuracy of the system logic. The pertinent phase angles are $\phi_A$, $\phi_B$ and $\phi_C$, which are related in the following arithmetic expression.

$$\phi_A + \phi_B = \phi_C \quad \text{[Equ. 1]}$$

To be clear, the phase angle $\phi_A$ is the phase angle associated with the voltage difference $V_{12}$ between the first sensor 48a and the second sensor 48b; the phase angle $\phi_B$ is the phase angle associated with the voltage difference $V_{23}$ between the second sensor 48b and the third sensor 48c; and the phase angle $\phi_C$ is the phase angle associated with the voltage difference $V_{13}$ between the first sensor 48a and the third sensor 48c. Using the law of cosines the phase angles $\phi_A$, $\phi_B$ and $\phi_C$ may be calculated. The phase angle $\phi_A$ may be calculated using the determined values (measured, assigned or calculated) of $V_1$, $V_2$ and $V_{12}$. The phase angle $\phi_B$ may be calculated using the determined values (measured, assigned or calculated) of $V_2$, $V_3$ and $V_{23}$. The phase angle $\phi_C$ may be calculated using the determined values (measured, assigned or calculated) of $V_1$, $V_3$ and $V_{13}$. As noted, the phase angle $\phi_C$ is also the sum of the phase angles $\phi_A$ and $\phi_B$ as well as the product of the repeating target surface count of the first tone wheel 46a and the physical angle between the first and third sensors 48a and 48c normalized between 0 and $2\pi$ radians.

Figure 5:
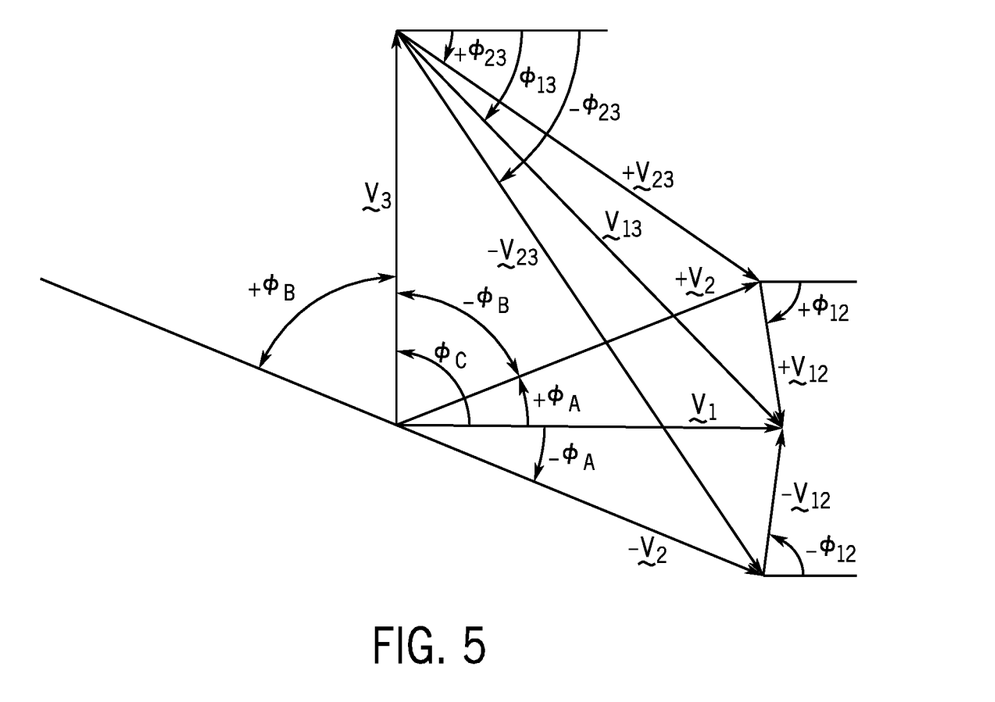
FIG. 5 is a phasor diagram illustrating example voltage phasors and phase angles for the torque determination system and method of this disclosure.

As noted by the positive and negative indications for phase angle $\phi_A$ and phase angle $\phi_{13}$ in FIG. 5, at this point in the analysis, the signs of both the phase angles $\phi_A$ and $\phi_b$ between the output of the first and second sensors 48a, 48b and between the output of the second and third sensors 48b, 48c are unresolved. This is indicated in FIG. 5 by the two alternate phasors shown for $V_2$ and thereby the two alternate phasors shown for $V_{23}$ as well as the two alternate phase angles for each of the phase angles $\phi_A$ and $\phi_B$. The various alternative phasors and phase angles are depicted in FIG. 5 with +/− indicators to represent alternatives. It should be noted that the +/− indicators as used in FIG. 5 do not represent that these values are inverses of one another, since the alternative voltages may be of the same magnitude and sign but with different phase angles, which may either be both positive, both negative or one positive/one negative.

Thus, the phase angles $\phi_A$ and $\phi_B$ each have positive and negative possible alternatives. However, only one set of phase angles $\phi_A$ and $\phi_B$ will properly resolve Equation 1 above, which will dictate the proper phase angle signs for both phase angles $\phi_A$ and $\phi_B$, and ultimately result in an accurate torque determination. To resolve this uncertainty, since $\phi_C$ is a known quantity and since only a unique set of phase angles $\phi_A$ and $\phi_{13}$ will sum up to the known phase angle $\phi_C$, the two sets of positive and negative values (four values total) for the phase angles $\phi_A$ and $\phi_B$ are evaluated in an iterative process of elimination to select the proper signs for each of the phase angles $\phi_A$ and $\phi_B$.

By way of example, consider that the known phase angle $\phi_C$ between the first and third sensors 48b, 48c was 90 degrees. Further consider that the phase angle $\phi_A$ between the first and second sensors 48a, 48b was determined to be +/−20 degrees and that the phase angle $\phi_B$ between the second and third sensors 48b, 48c was determined to be +/−70 degrees. To determine the correct sign of the phase angles $\phi_A$ and $\phi_B$, the following four possible calculations could be made to identify which unique combination of signs results in the proper value and sign of the known phase angle $\phi_C$.

$$(-20) + (-70) = -90$$

$$(+20) + (+70) = +90$$

$$(-20) + (+70) = +50$$

$$(+20) + (-70) = -50$$

The set of positive signs shown in the second equation above is the only set that results in a phase angle $\phi_C$ that equals positive 90. Thus, in this example, the proper phase angle q'$_A$ is +20 and the proper phase angle $\varphi_B$ is +70.

The electrical phase angle can be mathematically related to torque, such that the actual torque may be determined based on the output voltages from the sensors 48a, 48b, 48c and the determined value and sign for the phase angle $\varphi_A$. The following discussion provides one example for calculating torque from phase angles in the case of a simple shaft.

Two calibration values must be known to convert from tone wheel phase to torque, namely, sensitivity and no-load offset. Sensitivity is defined as K/Z, meaning the stiffness of the shaft divided by the number of teeth on the tone wheel. Stiffness is calculated as K=JG/L, where J is the polar moment of inertia of the shaft section, G is the modulus of rigidity and L is the distance between the tone wheels. The no-load offset, $\varphi_0$, is the phase shift between the first sensor 48a and the second sensor 48b when there is no load.

It should be noted that in the system and method of this disclosure the relative placement of the sensors 48a, 48b need not be precise or exactly known from machine to machine, nor does the peak voltage output of the first sensor 48a need to be aligned or in sync with the peak voltage output of the second sensor 48b. However, the tone frequency or fundamental frequency of the two sensors 48a, 48b should be the same, which can be achieved by using two tone wheels 46a, 46b on the same shaft, each with the same number of teeth or repeating target surfaces. Still, it is possible for the two tone wheels to be on separate shafts joined by a gear mesh provided the two tone wheels have the requisite number of repeating target surfaces.

The sensitivity may be calculated or measured, and has units of N-m/radians. The no-load offset must be determined in situ because it is a system parameter, that is, it depends not only on the arbitrary clocking of the two tone wheels 46a, 46b relative to each other, but also includes the clocking of the sensors 48a, 48b, 48c relative to each other. The mechanical unit must be run for a period of time at a single "known" load, T$_{cal}$, and the no-load phase is then calculated in units of radians using the measured phase shift, $\varphi_{cal}$.

Thus, the following two phase values are related as shown below:

$$\varphi_0 = \varphi_{cal} - \frac{Z}{K} T_{cal} \quad \text{[Eqn. 2]}$$

The value of torque may then be calculated as shown below:

$$T = \frac{K}{Z}(\varphi_A - \varphi_0) \quad \text{[Eqn. 3]}$$

Thus, various example embodiments of the disclosed system and method have been described by which the value of torque applied to a rotating shaft may be determined. The system and method assess torque by sensing torsion or angular displacement at one axial position of the shaft with respect to another. The torque is determined based upon the phase difference between electrical signals generated by sensors detecting the rotation, and the sign of the phase difference, to thereby determine the angular position of shaft-mounted tone wheels. Unlike certain conventional systems, with the system and method of this disclosure the relative arrangement of the shaft, tone wheels and the sensors need not be constrained to generating phase angles between the sensors of known signs or within prescribed angles. In conventional systems where the phase angle sign is not determined mathematically or otherwise, the torque computation would be susceptible to inaccuracies or assumptions, since it would be unknown whether the phase angle $\varphi_A$ between the voltages of the first and second sensors was positive or negative, and thus whether the value was added to or subtractive from the no load phase angle $\varphi_0$, when computing torque. With the system and method of this disclosure, this shortcoming of conventional systems has been eliminated, thereby giving greater accuracy and reliability in the torque reading with less design constrains on the torque determination system and method.

Also, the following examples are provided, which are numbered for convenient reference, as follows:

1. A system for determining torque applied to a rotating shaft by a load, comprising a first wheel coupled to the shaft at a first axial position, the first wheel having a periphery with a plurality of first repeating target surfaces; a second wheel coupled to the shaft at a second axial position axially spaced from the first axial position, the second wheel having a periphery with a plurality of second repeating target surfaces; a first sensor proximate the periphery of the first wheel configured to detect rotation of the first wheel based on the first repeating target surfaces, corresponding to rotation of the shaft at the first axial position; a second sensor proximate the periphery of the second wheel configured to detect rotation of the second wheel based on the second repeating target surfaces, corresponding to rotation of the shaft at the second axial position; a third sensor proximate the periphery of the first wheel configured to detect rotation of the first wheel based on the first repeating target surfaces, wherein the third sensor is located at a fixed known angular displacement from the first sensor; a processor configured to receive signals from the first sensor, the second sensor and the third sensor to determine a first voltage ($V_1$), a second voltage ($V_2$), and a third voltage ($V_3$), corresponding to an output of the first sensor, the second sensor, and the third sensor, respectively; determine a first voltage difference ($V_{12}$) associated with the signals from the first sensor and the second sensor; determine a second voltage difference ($V_{13}$) associated with the signals from the first sensor and the third sensor; determine a third voltage difference ($V_{23}$) associated with the signals from the second sensor and the third sensor; determine a magnitude of a phase angle ($\varphi_A$) of the first wheel with respect to the second wheel based on the first voltage difference ($V_{12}$); determine a sign of the phase angle ($\varphi_A$) based on the second voltage difference ($V_{13}$) and the third voltage difference ($V_{23}$); determine a torque value from the load applied to the shaft at least in part based on the magnitude and sign of the phase angle ($\varphi_A$).

2. The system of example 1, wherein the processor is configured to determine the magnitude of the phase angle ($\varphi_A$) based on the first voltage ($V_1$) and the second voltage ($V_2$), wherein the phase angle ($\varphi_A$) has an unknown sign; determine the magnitude of a phase angle ($\varphi_B$) based on the second voltage ($V_2$) and the third voltage ($V_3$), wherein the phase angle ($\varphi_B$) has an unknown sign; determine the magnitude of a phase angle ($\varphi_C$) based on the first voltage ($V_1$) and the third voltage ($V_3$), the phase angle ($\varphi_C$) having a known sign; assign the phase angle ($\varphi_A$) as positive or negative to resolve a sum of the phase angle ($\varphi_A$)+the phase angle ($\varphi_B$) equal to the phase angle ($\varphi_C$); assign the phase angle ($\varphi_B$) as positive or negative to resolve the sum of the phase angle ($\varphi_A$)+the phase angle ($\varphi_B$) equal to the phase angle ($\varphi_C$); and determine the torque based on the magnitude of the phase angle ($\varphi_A$) and the assigned sign.

3. The system of example 1, wherein the processor is further configured to determine the magnitude of a phase angle ($\varphi_B$) based on the second voltage ($V_2$) and the third voltage ($V_3$) and determine the magnitude of a phase angle ($\varphi_C$) based on the first voltage ($V_1$) and the third voltage ($V_3$).

4. The system of example 3, wherein the processor is further configured to compare the phase angle ($\varphi_C$) to a sum of the phase angle ($\varphi_A$)+the phase angle ($\varphi_B$) to determine a sign of the phase angle ($\varphi_A$).

5. The system of example 3, wherein the value of the phase angle ($\varphi_C$) is a known quantity based on a physical placement of the first sensor and the third sensor at the first wheel.

6. The system of example 1, wherein the first wheel and the second wheel are tone wheels.

7. The system of example 1, wherein the first sensor, the second sensor, and the third sensor are electromagnetic pickups.

8. The system of example 1, wherein the first repeating target surface and the second repeating target surface are physical teeth.

9. The system of example 1, wherein the first repeating target surface and the second repeating target surface are discrete magnetic portions of the peripheries of the first wheel and second wheel.

10. The system of claim 1, wherein the torque is determined based on one or more calibration values including a sensitivity of the shaft and a no-load offset of the shaft.

11. The system of claim 1, wherein the phase angle ($\varphi_C$) is estimated as a product of a quantity of repeating surfaces of the first repeating target surface and an angle ($\alpha$) defined between the first sensor and the third sensor.

12. The system of example 1, wherein third sensor is located at a non-integer number multiple of repeating target surfaces relative to the first sensor.

13. The system of example 1, wherein the first repeating target surfaces are the same as the second repeating target surfaces 14. The system of example 1, wherein the number of repeating target surfaces on the first wheel is equal to the number of repeating target surfaces on the second wheel.

15. A method for determining torque applied to a rotating shaft by a load, the shaft having a first wheel disposed at a first axial position with a plurality of first repeating target surfaces on its periphery, a second wheel located at a second axial position with a plurality of second repeating target surfaces on its periphery, a first sensor proximate the periphery of the first wheel, a second sensor proximate the periphery of the second wheel, and a third sensor proximate the periphery of the first wheel, wherein the third sensor is located at a fixed known angular displacement from the first sensor, the method comprising determining a first voltage ($V_1$), a second voltage ($V_2$), and a third voltage ($V_3$), corresponding to an output of the first sensor, the second sensor, and the third sensor, respectively; determining a first voltage difference ($V_{12}$) associated with the signals from the first sensor and the second sensor; determining a second voltage difference ($V_{13}$) associated with the signals from the first sensor and the third sensor; determining a third voltage difference ($V_{23}$) associated with the signals from the second sensor and the third sensor; determining a magnitude of a phase angle ($\varphi_A$) of the first wheel with respect to the second wheel based on the first voltage difference ($V_{12}$); determining a sign of the phase angle ($\varphi_A$) based on the second voltage difference ($V_{13}$) and the third voltage difference ($V_{23}$); and determining a torque value from the load applied to the shaft at least in part based on the magnitude and sign of the phase angle ($\varphi_A$).

As will be appreciated by one skilled in the art, certain aspects of the disclosed subject matter may be embodied as a method, system (e.g., a work vehicle control system included in a work vehicle), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that may contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

Aspects of certain embodiments are described herein may be described with reference to flowchart illustrations and/or block diagrams of methods, apparatus (systems) and computer program products according to embodiments of the invention. It will be understood that each block of any such flowchart illustrations and/or block diagrams, and combinations of blocks in such flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block (or otherwise described herein) may occur out of the order noted in the figures. For example, two blocks shown in succession (or two operations described in succession) may, in fact, be executed substantially concurrently, or the blocks (or operations) may sometimes be executed in the reverse order, depending upon the functionality involved. It will also be noted that each block of any block diagram and/or flowchart illustration, and combinations of blocks in any block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A system for determining torque applied to a rotating shaft by a load, comprising:

a first wheel coupled to the shaft at a first axial position, the first wheel having a periphery with a plurality of first repeating target surfaces;

a second wheel coupled to the shaft at a second axial position axially spaced from the first axial position, the second wheel having a periphery with a plurality of second repeating target surfaces;

a first sensor proximate the periphery of the first wheel configured to detect rotation of the first wheel based on the first repeating target surfaces, corresponding to rotation of the shaft at the first axial position;

a second sensor proximate the periphery of the second wheel configured to detect rotation of the second wheel based on the second repeating target surfaces, corresponding to rotation of the shaft at the second axial position;

a third sensor proximate the periphery of the first wheel configured to detect rotation of the first wheel based on the first repeating target surfaces, wherein the third sensor is located at a fixed known angular displacement from the first sensor;

a processor configured to receive signals from the first sensor, the second sensor and the third sensor to:
determine a first voltage ($V_1$), a second voltage ($V_2$), and a third voltage ($V_3$), corresponding to an output of the first sensor, the second sensor, and the third sensor, respectively;
determine a first voltage difference ($V_{12}$) associated with the signals from the first sensor and the second sensor;
determine a second voltage difference ($V_{13}$) associated with the signals from the first sensor and the third sensor;
determine a third voltage difference ($V_{23}$) associated with the signals from the second sensor and the third sensor;
determine a magnitude of a phase angle ($\varphi_A$) of the first wheel with respect to the second wheel based on the first voltage difference ($V_{12}$);
determine a sign of the phase angle ($\varphi_A$) based on the second voltage difference ($V_{13}$) and the third voltage difference ($V_{23}$); and
determine a torque value from the load applied to the shaft at least in part based on the magnitude and sign of the phase angle ($\varphi_A$).

2. The system of claim 1, wherein the processor is configured to:
determine the magnitude of the phase angle ($\varphi_A$) based on the first voltage ($V_1$) and the second voltage ($V_2$), wherein the phase angle ($\varphi_A$) has an unknown sign;
determine the magnitude of a phase angle ($\varphi_B$) based on the second voltage ($V_2$) and the third voltage ($V_3$), wherein the phase angle ($\varphi_B$) has an unknown sign;
determine the magnitude of a phase angle ($\varphi_{CR}$) based on the first voltage ($V_1$) and the third voltage ($V_3$), the phase angle ($\varphi_D$) having a known sign;
assign the phase angle ($\varphi_A$) as positive or negative to resolve a sum of the phase angle ($\varphi_A$)+the phase angle ($\varphi_B$) equal to the phase angle ($\varphi_C$);
assign the phase angle delta ($\varphi_B$) as positive or negative to resolve the sum of the phase angle ($\varphi_A$)+the phase angle ($\varphi_B$) equal to the phase angle ($\varphi_A$); and
determine the torque based on the magnitude of the phase angle ($\varphi_A$) and the assigned sign.

3. The system of claim 1, wherein the processor is further configured to:

determine the magnitude of a phase angle ($\varphi_B$) based on the second voltage ($V_2$) and the third voltage ($V_3$); and
determine the magnitude of a phase angle ($\varphi_C$) based on the first voltage ($V_1$) and the third voltage ($V_3$).

4. The system of claim 3, wherein the processor is further configured to compare the phase angle ($\varphi_C$) to a sum of the phase angle ($\varphi_A$)+the phase angle ($\varphi_B$) to determine a sign of the phase angle ($\varphi_A$).

5. The system of claim 3, wherein the value of the phase angle ($\varphi_C$) is a known quantity based on a physical placement of the first sensor and the third sensor at the first wheel.

6. The system of claim 1, wherein the first wheel and the second wheel are tone wheels.

7. The system of claim 1, wherein the first sensor, the second sensor, and the third sensor are electromagnetic pickups.

8. The system of claim 1, wherein the first repeating target surface and the second repeating target surface are physical teeth.

9. The system of claim 1, wherein the first repeating target surface and the second repeating target surface are discrete magnetic portions of the peripheries of the first wheel and second wheel.

10. The system of claim 1, wherein the torque is determined based on one or more calibration values including a sensitivity of the shaft and a no-load offset of the shaft.

11. The system of claim 1, wherein the phase angle ($\varphi_C$) is estimated as a product of a quantity of repeating surfaces of the first repeating target surface and an angle ($\alpha$) defined between the first sensor and the third sensor.

12. The system of claim 1, wherein third sensor is located at a non-integer number multiple of repeating target surfaces relative to the first sensor.

13. The system of claim 1, wherein the number of each of the first repeating target surfaces and second repeating target surfaces ranges from 10 to 150.

14. The system of claim 1, wherein the first repeating target surfaces are the same as the second repeating target surfaces.

15. The system of claim 1, wherein the number of repeating target surfaces on the first wheel is equal to the number of repeating target surfaces on the second wheel.

16. A method for determining torque applied to a rotating shaft by a load, the shaft having a first wheel disposed at a first axial position with a plurality of first repeating target surfaces on its periphery, a second wheel located at a second axial position with a plurality of second repeating target surfaces on its periphery, a first sensor proximate the periphery of the first wheel, a second sensor proximate the periphery of the second wheel, and a third sensor proximate the periphery of the first wheel, wherein the third sensor is located at a fixed known angular displacement from the first sensor, the method comprising:
determining a first voltage ($V_1$), a second voltage ($V_2$), and a third voltage ($V_3$), corresponding to an output of the first sensor, the second sensor, and the third sensor, respectively;
determining a first voltage difference ($V_{12}$) associated with the signals from the first sensor and the second sensor;
determining a second voltage difference ($V_{13}$) associated with the signals from the first sensor and the third sensor;
determining a third voltage difference ($V_{23}$) associated with the signals from the second sensor and the third sensor;
determining a magnitude of a phase angle ($\varphi_A$) of the first wheel with respect to the second wheel based on the first voltage difference ($V_{12}$);
determining a sign of the phase angle ($\varphi_A$) based on the second voltage difference ($V_{13}$) and the third voltage difference ($V_{23}$); and
determining a torque value from the load applied to the shaft at least in part based on the magnitude and sign of the phase angle ($\varphi_A$).

17. The system of claim 1, wherein the first wheel and the second wheel are tone wheels.

18. The system of claim 1, wherein the first sensor, the second sensor, and the third sensor are electromagnetic pickups.

19. The system of claim 1, wherein the first repeating target surface and the second repeating target surface are physical teeth.

20. A system for determining torque applied to a rotating shaft by a load, comprising:
a first wheel coupled to the shaft at a first axial position, the first wheel having a periphery with a plurality of first repeating target surfaces;
a second wheel coupled to the shaft at a second axial position axially spaced from the first axial position, the second wheel having a periphery with a plurality of second repeating target surfaces;
a first sensor proximate the periphery of the first wheel configured to detect rotation of the first wheel based on the first repeating target surfaces, corresponding to rotation of the shaft at the first axial position;
a second sensor proximate the periphery of the second wheel configured to detect rotation of the second wheel based on the second repeating target surfaces, corresponding to rotation of the shaft at the second axial position;
a third sensor proximate the periphery of the first wheel configured to detect rotation of the first wheel based on the first repeating target surfaces, wherein the third sensor is located at a fixed known angular displacement from the first sensor;
a processor configured to receive signals from the first sensor, the second sensor and the third sensor to:
determine a first voltage ($V_1$), a second voltage ($V_2$), and a third voltage ($V_3$), corresponding to an output of the first sensor, the second sensor, and the third sensor, respectively;
determine a first voltage difference ($V_{12}$) associated with the signals from the first sensor and the second sensor;
determine a second voltage difference ($V_{13}$) associated with the signals from the first sensor and the third sensor;
determine a third voltage difference ($V_{23}$) associated with the signals from the second sensor and the third sensor;
determine a magnitude of a phase angle ($\varphi_A$) of the first wheel with respect to the second wheel based on the first voltage ($V_1$) and the second voltage ($V_2$), wherein the phase angle ($\varphi_A$) has an unknown sign;
determine a magnitude of a phase angle ($\varphi_B$) based on the second voltage ($V_2$) and the third voltage ($V_3$), wherein the phase angle ($\varphi_B$) has an unknown sign;
determine a magnitude of a phase angle ($\varphi_C$) based on the first voltage ($V_1$) and the third voltage ($V_3$), the phase angle ($\varphi_C$) having a known sign;
assign the phase angle ($\varphi_3$) as positive or negative to resolve a sum of the phase angle ($\varphi_A$)+the phase angle ($\varphi_B$) equal to the phase angle ($\varphi_C$);

assign the phase angle delta ($\varphi_B$) as positive or negative to resolve the sum of the phase angle ($\varphi_A$)+the phase angle ($\varphi_B$) equal to the phase angle ($\varphi_C$); and
determine the torque based on the magnitude of the phase angle ($\varphi_A$) and the assigned sign.

* * * * *

UNITED STATES PATENT AND TRADEMARK OFFICE
CERTIFICATE OF CORRECTION

PATENT NO. : 10,955,302 B2  
APPLICATION NO. : 16/159369  
DATED : March 23, 2021  
INVENTOR(S) : Appleton et al.

Page 1 of 1

It is certified that error appears in the above-identified patent and that said Letters Patent is hereby corrected as shown below:

On the Title Page

In Column 2, Item (74) "ATTORNEY, AGENT, OR FIRM", Line 1, delete "Klintworth & Rozenblatt IP LLP" and insert -- Klintworth & Rozenblat IP LLP --, therefor.

In the Claims

In Column 18, Claim 2, Line 55, delete "phase angle ($\varphi_{CR}$)" and insert -- phase angle ($\varphi_C$) --, therefor.

In Column 18, Claim 2, Line 57, delete "phase angle ($\varphi_D$)" and insert -- phase angle ($\varphi_C$) --, therefor.

In Column 18, Claim 2, Line 63, delete "phase angle ($\varphi_A$)" and insert -- phase angle ($\varphi_C$) --, therefor.

In Column 20, Claim 20, Line 65, delete "phase angle ($\varphi_3$)" and insert -- phase angle ($\varphi_A$) --, therefor.

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*